(12) United States Patent
Sunaga et al.

(10) Patent No.: US 9,463,724 B2
(45) Date of Patent: Oct. 11, 2016

(54) HEADREST STRUCTURE AND HEADREST DEVICE

(71) Applicant: NHK SPRING CO., LTD., Yokohama-shi (JP)

(72) Inventors: Toshiaki Sunaga, Yokohama (JP); Takahiro Yajima, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 25 days.

(21) Appl. No.: 14/275,738

(22) Filed: May 12, 2014

(65) Prior Publication Data

US 2014/0339875 A1 Nov. 20, 2014

(30) Foreign Application Priority Data

May 15, 2013 (JP) .................. 2013-103543

(51) Int. Cl.
*B60N 2/48* (2006.01)
*B60N 2/58* (2006.01)
*B60N 2/60* (2006.01)

(52) U.S. Cl.
CPC .......... *B60N 2/4838* (2013.01); *B60N 2/4847* (2013.01); *B60N 2/58* (2013.01); *B60N 2/6009* (2013.01)

(58) Field of Classification Search
None
See application file for complete search history.

(56) References Cited

U.S. PATENT DOCUMENTS

| | | | | |
|---|---|---|---|---|
| 1,037,631 A | * | 9/1912 | Jones | 74/566 |
| 3,537,749 A | * | 11/1970 | Putsch et al. | 297/408 |
| 3,748,923 A | * | 7/1973 | Babbitt et al. | 74/566 |
| 4,503,730 A | * | 3/1985 | Irvin | 74/566 |
| 4,693,515 A | * | 9/1987 | Russo et al. | 297/391 |
| 4,980,803 A | * | 12/1990 | Richmond | F16H 63/42 116/28.1 |
| 4,991,907 A | * | 2/1991 | Tanaka | 297/408 |
| 5,261,726 A | * | 11/1993 | Yanagishita | 297/408 |
| 5,316,372 A | * | 5/1994 | Amner | 297/408 |
| 5,681,088 A | * | 10/1997 | Takei | 297/408 |
| 6,082,286 A | * | 7/2000 | Kovach et al. | 116/28.1 |
| 7,195,095 B2 | * | 3/2007 | Oana | 180/315 |
| 7,484,433 B2 | * | 2/2009 | Arakawa et al. | 74/566 |
| 7,984,951 B2 | * | 7/2011 | Sayama | 297/408 |
| 8,302,994 B2 | * | 11/2012 | Ko | 280/801.1 |
| 2013/0334860 A1 | * | 12/2013 | Adams et al. | 297/408 |

FOREIGN PATENT DOCUMENTS

JP 2007-167379 A 7/2007

\* cited by examiner

*Primary Examiner* — Charles A Fox
*Assistant Examiner* — Christopher E Veraa
(74) *Attorney, Agent, or Firm* — Knobbe Martens Olson & Bear LLP

(57) ABSTRACT

A headrest structure and a headrest device, including a bottom plate provided at a lower face of a headrest, and provided with an elongated hole extending in a seat front-rear direction through which a stay is inserted, a guide sheet having the same width as that of the elongated hole, that is longer in length than the elongated hole, whose both end portions are slidably supported by the bottom plate, and that is provided with an elongated guide hole smaller than the elongated hole, a concealing sheet provided with an attachment hole to which the stay is attached, and that is overlapped slidably on an upper face of the guide sheet so as to cover the elongated guide hole, and a wall portion that is formed at the bottom plate, and that restricts movement of the guide sheet and the concealing sheet in a seat width direction, are provided.

12 Claims, 8 Drawing Sheets

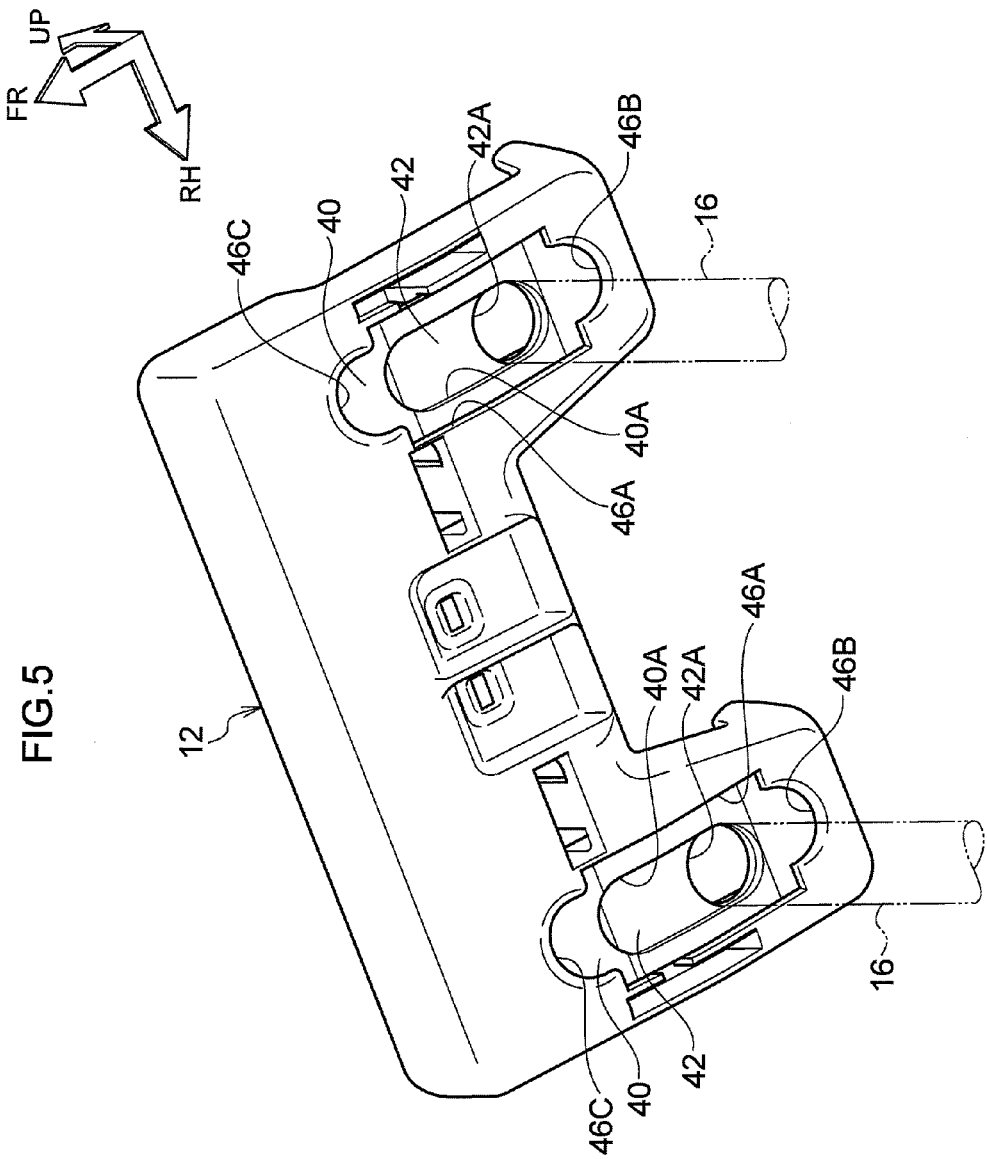

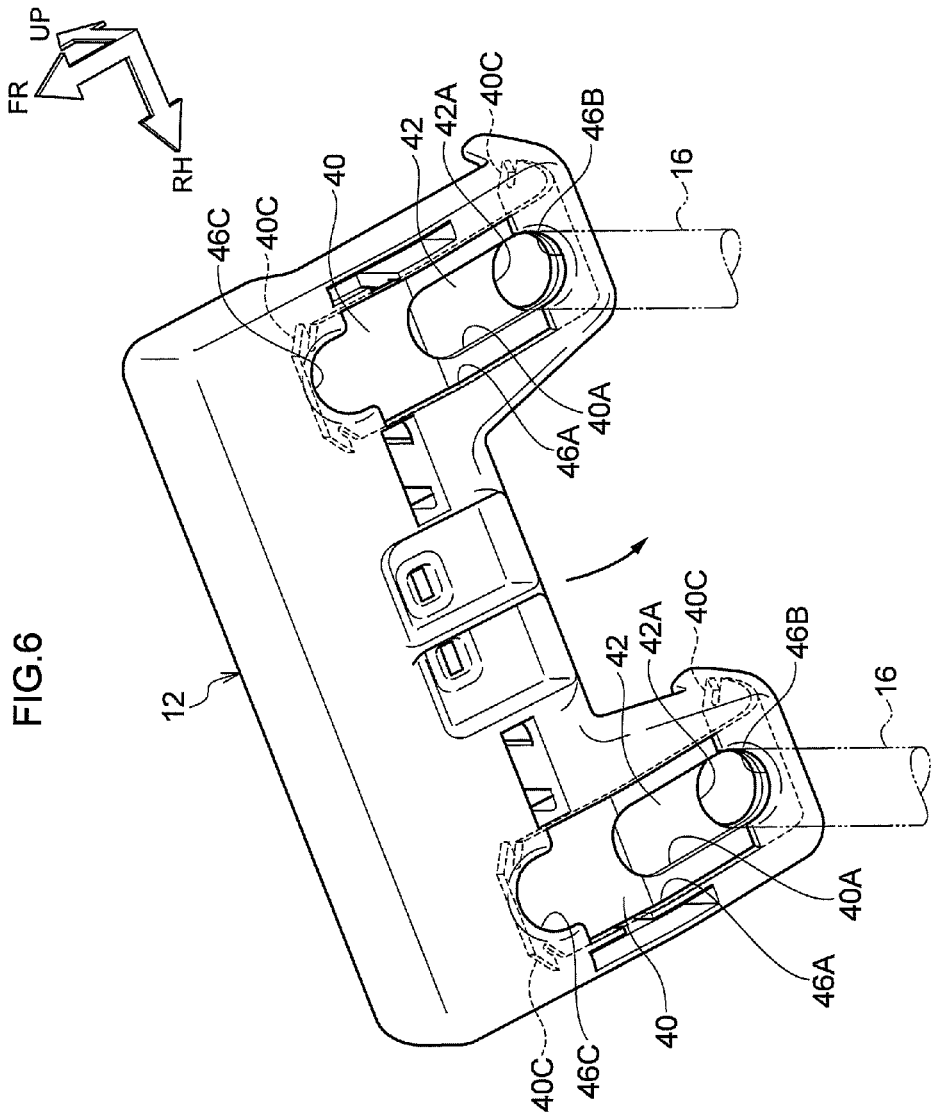

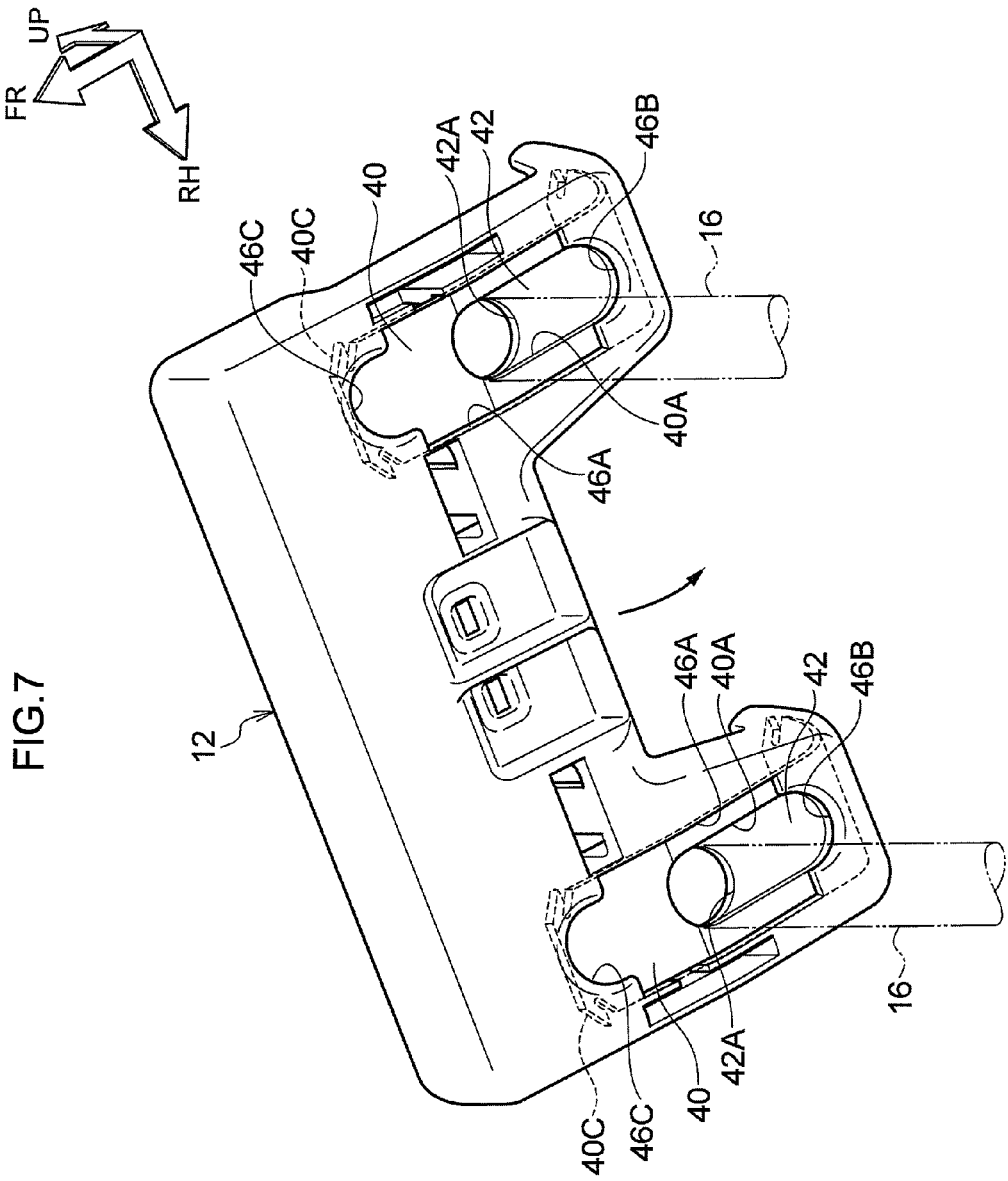

HEADREST STRUCTURE AND HEADREST DEVICE

CROSS-REFERENCE TO RELATED APPLICATION

This application claims priority under 35 USC 119 from Japanese Patent Application No. 2013-103543 filed May 15, 2013.

BACKGROUND

1. Field of the Invention

The present invention relates to a headrest structure and a headrest device provided with the headrest structure.

2. Related Art

A headrest device is known in which an elongated hole is formed to a lower face of a headrest, a stay is inserted through the elongated hole, and the headrest is attached so as to be capable of rotating in a seat front-rear direction. In this kind of the headrest device, a closing plate covering the elongated hole is provided at the inside of the headrest, and by changing an angle of the closing plate interlockingly with the rotating of the headrest, a headrest device is provided that constantly closes off the elongated hole of the headrest (for example, Japanese Patent Application Laid-Open (JP-A) No. 2007-167379).

A headrest device described in JP-A No. 2007-167379 is capable of suppressing intrusion of foreign objects inside a headrest. However, the structure is complex, result in much effort being required for assembly.

SUMMARY

In consideration of the above circumstances, the present invention is to provide a headrest structure, and a headrest device, that are capable of being easily assembled.

A headrest structure according to a first aspect includes: a bottom plate that is provided at a lower face of a headrest attached so as to be capable of rotating in a seat front-rear direction with respect to a stay provided at a seatback of a vehicle seat, and that is provided with an elongated hole extending in the seat front-rear direction through which the stay is inserted; a guide sheet that has the same width as a width of the elongated hole, that is longer than a length of the elongated hole, whose both end portions are slidably supported by the bottom plate, and that is provided with an elongated guide hole that is smaller than the elongated hole; a concealing sheet that is provided with an attachment hole to which the stay is attached, and that is overlapped slidably on an upper face of the guide sheet so as to cover the elongated guide hole; and a wall portion that is formed at the bottom plate, and that restricts movement of the guide sheet and the concealing sheet in a seat width direction.

In the headrest structure of the first aspect, the lower face of the headrest is provided with the bottom plate, and the bottom plate is provided with the elongated hole through which the stay is inserted. Moreover, the headrest is attached so as to be capable of rotating in the seat front-rear direction with respect to the stay inserted through the elongated hole. The guide sheet is slidably supported by the bottom plate, and the guide sheet is provided with the elongated guide hole that is smaller than the elongated hole. The concealing sheet, provided with the attachment hole to which the stay is attached, is slidably overlapped on the upper face of the guide sheet, and the elongated guide hole is covered by the concealing sheet. Furthermore, movement of the guide sheet and the concealing sheet in the seat width direction is restricted by the wall portion formed at the bottom plate. The guide sheet and the concealing sheet are moved relative to the bottom plate and along the wall portion when the headrest is rotated, enabling the elongated hole and the elongated guide hole to be always covered.

Moreover, the guide sheet is formed as the same width as the elongated hole and longer in length than the elongated hole, with both end portions of the guide sheet supported by the bottom plate. When attaching the guide sheet and the concealing sheet to the bottom plate, it is thereby sufficient to overlap the concealing sheet on the upper face of the guide sheet, and dive (tuck) the both end portions of guide sheet through-in the elongated hole from the outside of the bottom plate. Note that the "same width" referred to herein does not only include a case in which the guide sheet width and the elongated hole width perfectly match, but also includes a case in which the guide sheet width and the elongated hole width do not perfectly match, due to manufacturing or design-related circumstances, in which a gap exists between the elongated hole and the guide sheet of a size through which there is no intrusion of foreign objects.

It is possible that wall portions are formed at both sides in the seat width direction of the elongated hole so as to sandwich the guide sheet and the concealing sheet.

A headrest structure of a second aspect is the headrest structure of the first aspect, wherein anchor tabs, that are anchored at an anchoring portion formed at the bottom plate, are formed at both end portions of the guide sheet in a length direction of the guide sheet.

In the headrest structure of the second aspect, the anchor tab is anchored by the anchoring portion when the guide sheet slides on the bottom plate due to relative movement between the stay and the bottom plate, enabling detachment of the guide sheet from the elongated hole to be suppressed. Moreover, when the guide sheet and the concealing sheet are attached from the outside of the bottom plate, the anchor tab is made to contact the hole edge of the elongated hole and is flex-deformed, thereby enabling the guide sheet to be tucked through the elongated hole.

A headrest structure of the third aspect is the headrest structure of the first aspect or the second aspect, wherein the wall portion is provided with a stopper portion that projects out from the wall portion to an opening face of the elongated hole so as to cover both end portions of the guide sheet in a width direction of the guide sheet and both end portions of the concealing sheet in a width direction of the concealing sheet.

In the headrest structure of the third aspect, both width direction end portions of the concealing sheet abut the stopper portion when upward force acts on respect to the guide sheet and the concealing sheet, enabling detachment of the guide sheet and the concealing sheet from the bottom plate to be suppressed.

A headrest structure of a fourth aspect is the headrest structure of any one of the first aspect to the third aspect, wherein a groove, whose width is narrower than the width of the elongated hole and that receives the stay, is formed at each of both end portions of the elongated hole in a length direction of the elongated hole of the bottom plate.

In the headrest structure of the fourth aspect, forming the grooves enables the rotating range of the headrest to be widened, while still securing regions to support the both end portions of the guide sheet.

The grooves are preferably have the semi-circular shape.

A headrest structure of a fifth aspect is the headrest structure of any one of the first aspect to the fourth aspect, wherein the bottom plate is formed in a curved shape that corresponds to a trajectory of rotation of the headrest.

The headrest structure of the fifth aspect enables the headrest to be rotated smoothly.

A headrest device of a sixth aspect includes: a headrest with the headrest structure of any one of the first aspect to the fifth aspect provided at a lower face of the headrest; the stay that is attached to the headrest; and a headrest rotate mechanism that couples the headrest and the stay so as to be capable of rotating in the seat front-rear direction.

The headrest device of the sixth aspect enables an occupant seated in the vehicle seat to rotate the headrest to a desired angle. Intrusion of foreign objects inside the headrest is also capable of being suppressed.

As explained above, the present invention enables easy assembly of a headrest structure, and of a headrest device.

BRIEF DESCRIPTION OF THE DRAWINGS

Embodiments of the invention will be described in detail with reference to the following figures, wherein:

FIG. 5 is a perspective view illustrating a front face side of a cover plate according to an exemplary embodiment of the present invention;

FIG. 6 is a perspective view of a cover plate in a state in which a headrest according to an exemplary embodiment of the present invention is disposed in an initial position;

FIG. 7 is a perspective view of a cover plate in a state in which a headrest according to an exemplary embodiment of the present invention is in the process of moving from an initial position to a release position.

DETAILED DESCRIPTION

Figure 1:
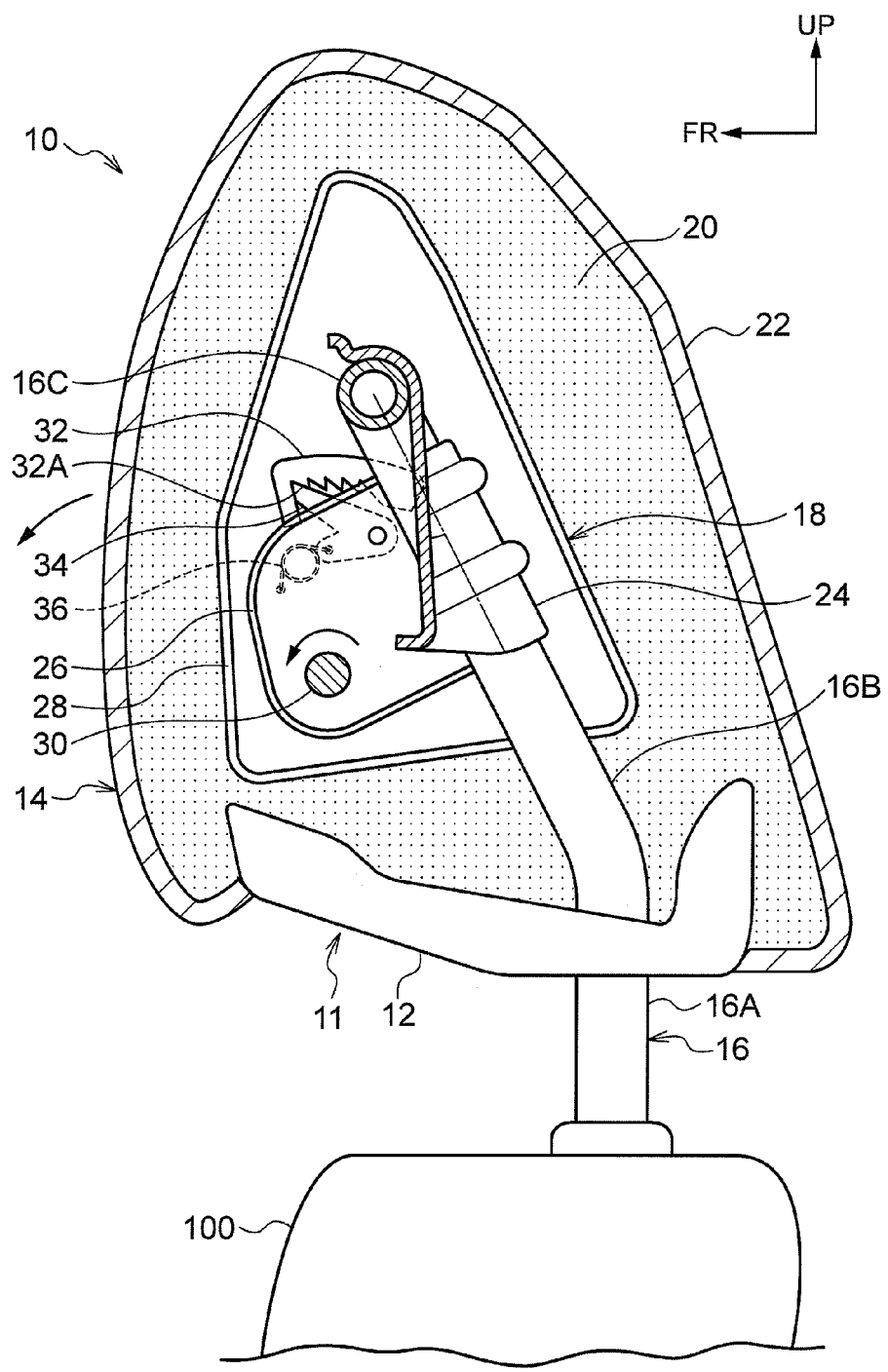
FIG. 1 is a cross-section view illustrating a headrest device according to an exemplary embodiment of the present invention.

Explanation follows regarding an example of a headrest device 10 provided with a headrest structure 11 according to an exemplary embodiment of the present invention, with reference to the drawings. Note that, in the drawings, an arrow FR indicates a forward direction of a seat, an arrow UP indicates an upward direction of the seat and an arrow RH indicates a right direction of the seat.

Headrest Device Configuration

As illustrated in FIG. 1, the headrest device 10 is provided above a seatback 100 that configures a vehicle seat, and is configured principally including a headrest 14 having a headrest structure 11, a headrest stay 16 and a headrest rotating structure 18.

The headrest 14 is configured principally including a headrest cushion portion 20 that forms a main body of the headrest 14, and a skin member 22 that covers the headrest cushion portion 20. The headrest cushion portion 20 is formed so as to cover the headrest rotating structure 18, and, from the seat rear side, supports a head of an occupant seated on a seat cushion, not shown in the drawings, of the vehicle seat.

The skin member 22 is provided to a portion of the headrest 14, excluding a lower face of the headrest 14, and covers the headrest cushion portion 20. A cover plate 12, serving as a bottom plate configuring the headrest structure 11, is attached to the lower face of the headrest 14. Note that, in the present exemplary embodiment, the cover plate 12 is not covered by the skin member 22, however, from a point of view of design, the cover plate 12 may be covered by the skin member 22. This enables suppression of the cover plate 12 being viewed by the occupant. Details of the cover plate 12 are explained later.

The headrest 14 is coupled to the seatback 100 by the headrest stay 16. The headrest stay 16 extends in the seat upward direction from an upper portion of the seatback 100, and is formed by bending a steel pipe. The shape of the headrest stay 16 is an inverted U shaped profile, as viewed from a seat front side.

The headrest stay 16 is configured including stay portions 16A that extend from the seatback 100 to the headrest 14, side frame portions 16B that are inserted inside the headrest 14 through the cover plate 12 and that incline toward the seat front, and a top frame portion 16C that is disposed and extended in the seat width direction and connects upper end portions of the side frame portions 16B.

A pressure receiving member 24 that configures the headrest rotating structure 18 is attached to an upper portion of the side frame portions 16B. The pressure receiving member 24 is formed by bending sheet metal (plate), and spans across between the pair of the side frame portions 16B. Both seat width direction end portions of the pressure receiving member 24 are configured as shaft receiving plates 26 that extend toward the seat front, and that face each other in the seat width direction (only one of the shaft receiving plates 26 is shown in FIG. 1).

The shaft receiving plates 26 are formed in a substantially rectangular shape as viewed from the seat width direction. A side cover 28, that is larger than the shaft receiving plate 26, is provided at the seat width direction outside of the shaft receiving plate 26. The shaft receiving plate 26 and the side cover 28 are coupled together by a rotation shaft 30, that has the seat width direction as the axial direction. Furthermore, the headrest cushion portion 20 is fixed to the side cover 28. The side cover 28, the headrest cushion portion 20 fixed to the side cover 28, the skin member 22, and the cover plate 12 are thereby capable of rotating in the seat front-rear direction with respect to the shaft receiving plates 26. The side cover 28 and the pressure receiving member 24 are also coupled together by a coil spring, not shown in the drawings, and the side cover 28 is biased toward the seat rear.

A ratchet plate 32, a pawl 34 and a reverse torsion spring 36, that configure the headrest rotating structure 18, are provided between the shaft receiving plate 26 and the side cover 28. The pawl 34 is supported by the shaft receiving plate 26 so as to be capable of rotating, and one end portion of the pawl 34 abuts teeth portion 32A of the ratchet plate 32. Another end portion of the pawl 34 is coupled to the shaft receiving plate 26 by the reverse torsion spring 36, and the pawl 34 is biased toward the seat rear by the reverse torsion spring 36.

In an initial position shown in FIG. 1, the headrest 14 is in the most upright (standing) state. When the occupant applies force to the headrest 14 toward the seat front side, the headrest 14 rotates toward the seat front, about the rotation shaft 30 as rotation center. When this occurs, the ratchet plate 32 rotates together with the headrest 14, and the pawl 34 attached to the shaft receiving plate 26 is moved along the teeth portion 32A of the ratchet plate 32, and anchoring (catching) the headrest 14. The headrest 14 can thereby be tilted to the preferred position.

In order to return to the headrest 14 to the initial position, the headrest 14 is rotated as far as possible toward the seat front side (rotated to the most forward position). The ratchet plate 32 thereby moves toward the seat front, and the anchored state of the teeth portion 32A of the ratchet plate 32 and the pawl 34 is released. The headrest 14 is accordingly rotated back to the initial position under biasing force of a coil spring, not shown in the drawings.

Note that, although the headrest rotating structure 18 provided with a ratchet mechanism has been used in the present exemplary embodiment, the invention is not limited thereto, and the headrest 14 may be attached so as to be capable of rotating in the seat front-rear direction by another method. For example, the top frame portion 16C of the headrest stay 16 may be merely attached so as to be capable of rotating to the inside of the headrest 14. In such a case, the headrest 14 rotates about the axis of the top frame portion 16C as rotation center.

Headrest Structure 11 Configuration

Figure 2:
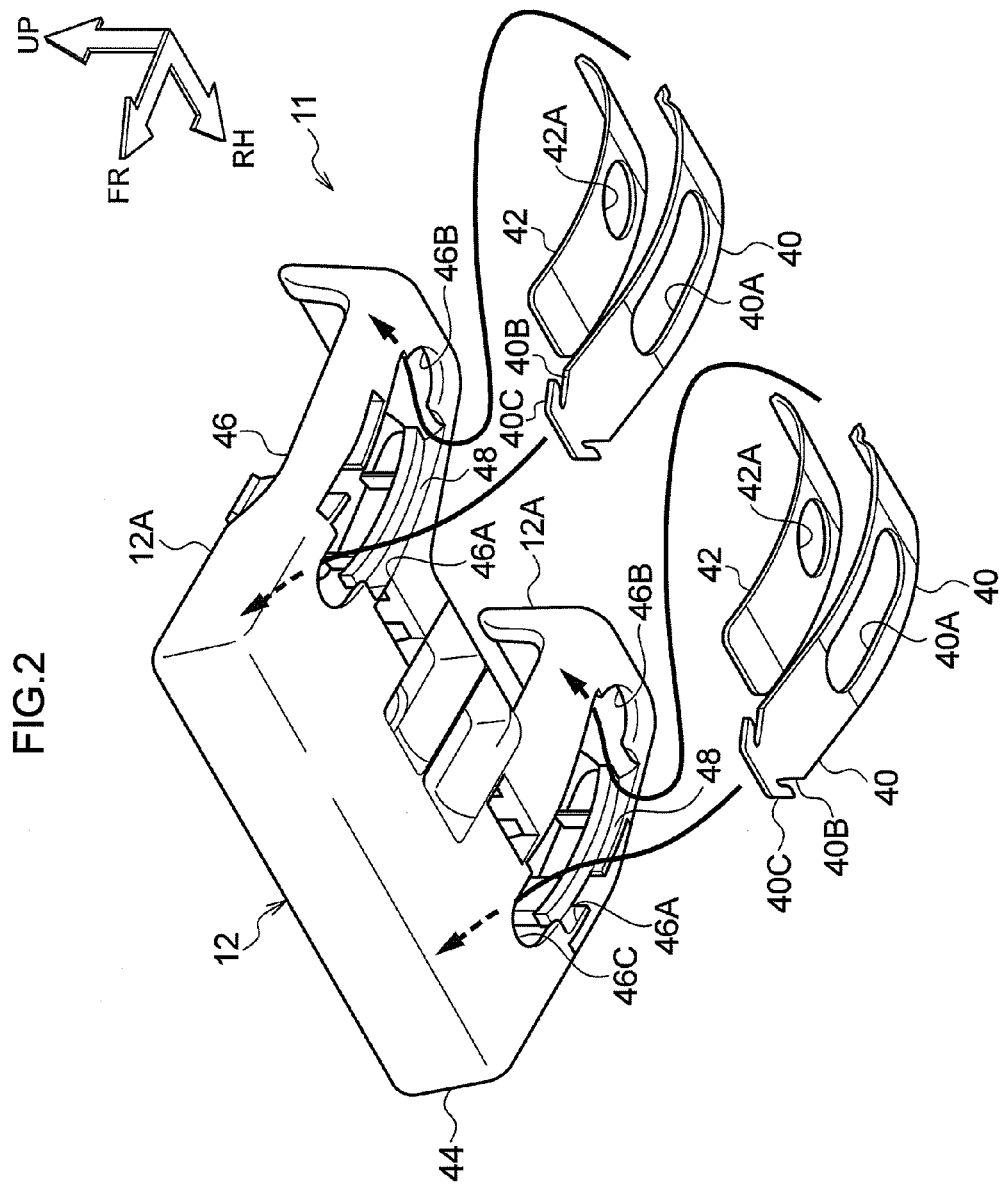
FIG. 2 is an exploded perspective view illustrating relevant portions of a headrest device according to an exemplary embodiment of the present invention.

Explanation follows regarding the headrest structure 11 according to the present exemplary embodiment. As illustrated in FIG. 2, the headrest structure 11 is configured mainly including the cover plate 12, two guide sheets 40 and two concealing sheets 42.

The cover plate 12 is a plate shaped member formed of an integrally molded resin, and is formed with a substantially U shaped profile, open to the seat rear side, when viewed from below the seat (refer to FIG. 5). Moreover, an outer periphery portion of the cover plate 12 is bent (curved) toward a back face side (the seat upward side) to form an outer periphery rib 12A. Furthermore, a bottom face of the cover plate 12 is formed as a gently curved shape so as to bulge to the seat downward side. Note that, in the present exemplary embodiment, the curved shape of the cover plate 12 is formed corresponding to the rotating trajectory of the headrest 14, however the invention is not limited thereto, and the cover plate 12 may be formed with a flat face shape.

The cover plate 12 is configured mainly including a base portion 44 that extends in the seat width direction, and a pair of arm portions 46 that extent from both seat width direction end portions of the base portion 44 toward the seat rear. An elongated (long) hole 46A is formed at each center portion of the respective arm portions 46. The elongated hole 46A, through which the headrest stay 16 is inserted, is substantially rectangular shaped and extend in the seat front-rear direction.

As illustrated in FIG. 5, grooves 46B and 46C, that are substantially semi-circular shaped viewed from a seat lower face, are formed to both seat front-rear direction end sides of each of the elongated holes 46A. The grooves 46B and 46C are formed continuous to the elongated hole 46A in a center portion in the seat width direction of the elongated hole 46A, and are narrower in width than the elongated hole 46A. The grooves 46B and 46C are formed such that the headrest stay 16 eaters into them, and the initial position is the headrest 14 position in a state in which the headrest stay 16 is received by the groove 46B which is at the seat rear side. Note that both seat front-rear direction end portions of the elongated hole 46A may be formed in a substantially semi-circular shape, without forming the grooves 46B, 46C to the elongated hole 46A. Note that the shape of the grooves 46B and 46C is preferably corresponded to the cross sectional shape of the headrest stay 16, however, is not limited to the semi-circular shape.

Figure 3:
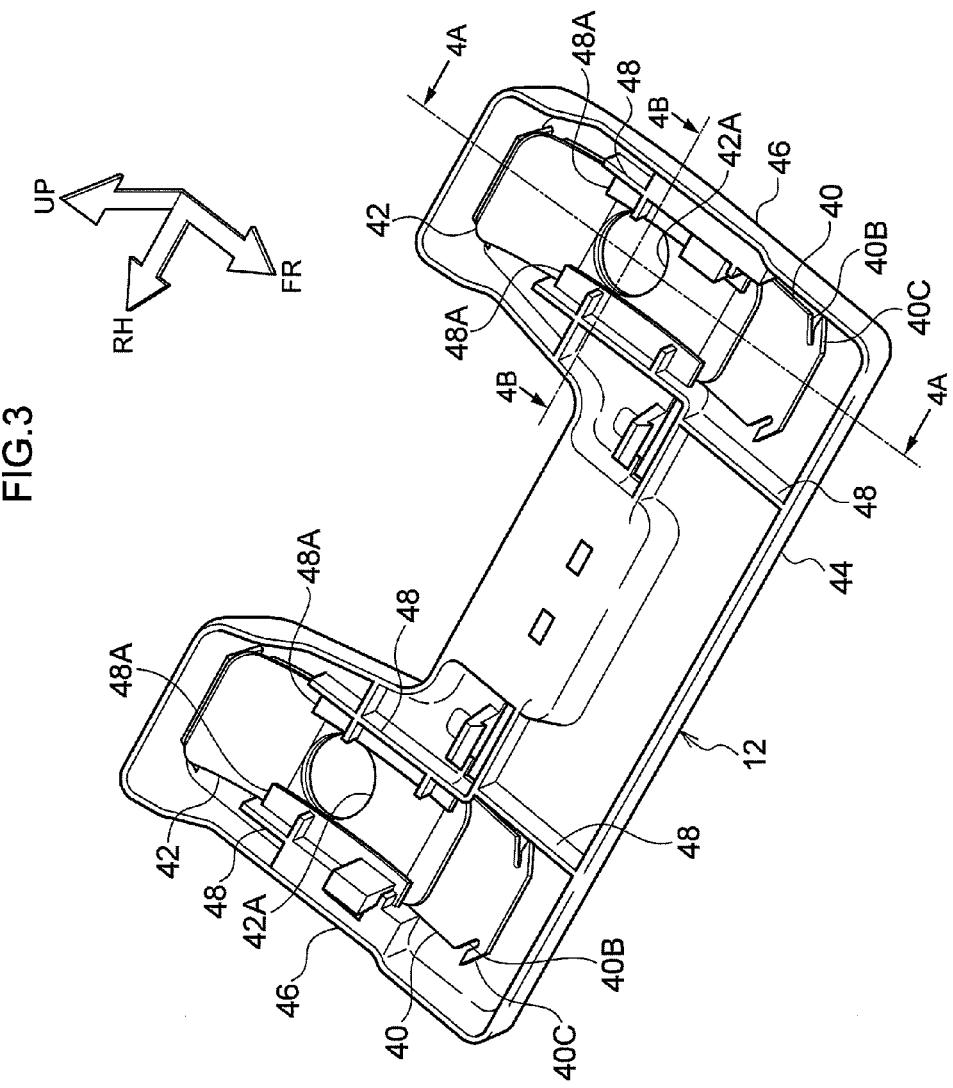
FIG. 3 is a perspective view illustrating a back face side of a cover plate according to an exemplary embodiment of the present invention.

As illustrated in FIG. 3, reinforcement ribs 48, serving as plural wall portion (in other words, protruding portions or vertical wall portions), are formed to the back face side of the cover plate 12, and the bottom face of the cover plate 12 is partitioned by the reinforcement ribs 48. The reinforcement ribs 48 are formed projecting toward the back face side (the seat upward side) of the cover plate 12. The rigidity of the cover plate 12 is increased by forming the reinforcement ribs 48 in this way.

As illustrated in FIG. 2, the reinforcement ribs 48 that are formed at the hole edges of the elongated hole 46A are positioned at center portion in the seat front-rear direction of the arm portion 46, and are respectively formed at both sides of the length direction hole edges of the elongated hole 46A (at both sides in the seat width direction of the elongated hole 46A). The guide sheet 40 and the concealing sheet 42 are attached between the reinforcement ribs 48 so as to be sandwiched between the reinforcement ribs 48, and their movement in the seat width direction is restricted by the reinforcement ribs 48 (refer to FIG. 4B). Each reinforcement rib 48, formed at the seat width direction inner side, branches at an end portion at the seat front side, and, extends toward the seat width direction inside and toward the seat front therefrom respectively.

Figure 4A:
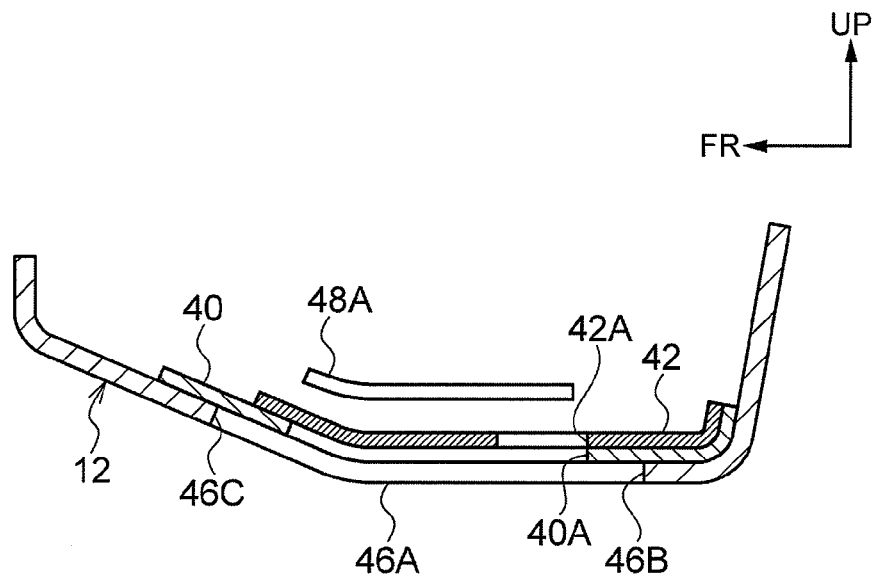
FIG. 4A is a cross-section view taken along line 4A-4A in FIG. 3.
Figure 4B:
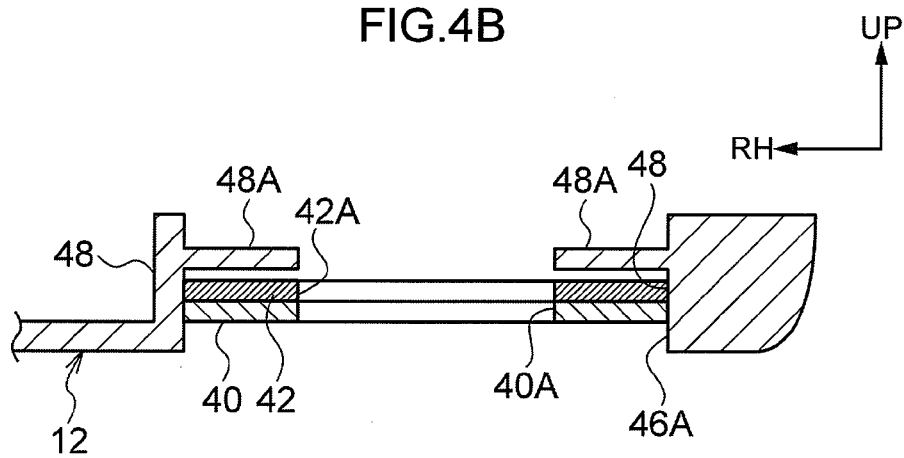
FIG. 4B is a cross-section view taken along line 4B-4B in FIG. 3.

Stopper portions 48A, that project out from the reinforcement ribs 48 to an opening face of the elongated hole 46A, are formed at the reinforcement ribs 48 that are formed at the hole edges of each of the elongated holes 46A. As illustrated in FIG. 4A and FIG. 4B, the stopper portions 48A are formed with the seat up-down direction as a thickness direction, and are formed in a curved shape that runs parallel to the cover plate 12. The stopper portions 48A cover both end portions in the seat width direction of the guide sheet 40 and the concealing sheet 42 respectively, and project out to positions at which the leading ends of the stopper portions 48A do not reach (cover) a circular hole 42A (described later) of the concealing sheet 42. Note that although the stopper portions 48A are curved in the present exemplary embodiment, the invention is not limited thereto, and the stopper portions 48A may be formed in a flat plane shape.

Both end portions of the guide sheet 40 are slidably supported at both sides in the seat front-rear direction of each elongated hole 46A, and the concealing sheet 42 slidably overlaps on the guide sheet 40. As illustrated in FIG. 2, the guide sheet 40 and the concealing sheet 42 are flexible resin sheets, and are formed in elongated shapes with the seat front-rear direction as a length direction. Moreover, the widths of the guide sheet 40 and the concealing sheet 42 are formed as the same width as the elongated hole 46A of the cover plate 12. Note that "the same width" referred to herein includes a margin of error occurring due to manufacture or design-related circumstances.

The guide sheet 40 is formed as longer than the concealing sheet 42, and longer than the elongated hole 46A. Moreover, an elongated (long) hole 40A, that serves as an elongated (long) guide hole through which the headrest stay 16 is inserted, is formed at each center portion of the respective guide sheets 40. The elongated hole 40A is narrower in width than the elongated hole 46A of the cover plate 12, and is formed shorter than the elongated hole 46A.

Both length direction end portions of each guide sheet 40 are formed with narrow width portions 40B that gradually narrow in width toward the respective leading ends, and a flexible anchor (catch) tabs 40C extends from each of the narrow width portions 40B toward the both width direction outsides. The anchor tab 40C is integrally formed to the guide sheet 40 at the both width direction sides of the narrow width portion 40B, and two leading end portions of each anchor tab 40C are directed toward the length direction center portion side of the guide sheet 40. Moreover, in an unloaded state, the two leading end portions of the anchor tab 40C protrude slightly more toward the respective both width direction outsides than the both width direction ends of the guide sheet 40. Note that the anchor tab 40C may be formed with a different shape. For example, the anchor tab 40C may be formed to extend straight out from the guide sheet 40 in the seat width directions. Moreover, the anchor tab 40C may not be formed at all in a case in which the guide sheet 40 is long in length.

The concealing sheet 42, that is slidably overlapped at an upper face of the guide sheet 40, is shorter than the guide sheet 40, and is formed with a length capable of covering the elongated hole 40A of the guide sheet 40. The circular hole 42A, that serves as an attachment hole, which is in communication with the elongated hole 40A of the guide sheet 40, is formed at a center portion of each of the concealing sheets 42, and the headrest stay 16 is inserted through and attached to the circular hole 42A. Note that, in a state in which the headrest stay 16 is attached to the circular hole 42A, there may be gaps between the circular hole 42A and the headrest stay 16 due to margin of error relating to design or manufacture.

Operation

Explanation follows regarding operation of the headrest structure 11 according to the present exemplary embodiment. When attaching the guide sheet 40 and the concealing sheet 42 to the cover plate 12, as illustrated in FIG. 2, in a state in which the concealing sheet 42 is overlapped on the upper face of the guide sheet 40, both length direction end portions of the guide sheet 40 are inserted into and attached to the elongated hole 46A of the cover plate 12.

When the one end portion of the guide sheet 40 is inserted into the elongated hole 46A, the leading end of the anchor tab 40C, formed at the one end portion of the guide sheet 40, contacts the hole edge of the elongated hole 46A. When the guide sheet 40 is pushed in further in this state, the anchor tab 40C is flex-deformed, becoming smaller a gap with the narrow width portion 40B. The leading end of the anchor tab 40C thereby recedes more to the inside than the width of the guide sheet 40, and the one end portion of the guide sheet 40 can be smoothly dived (tucked) into the elongated hole 46A. Similarly, another end portion of the guide sheet 40 can also be dived into and attached to the elongated hole 46A from the outside of the cover plate 12. Easy attachment of the guide sheet 40 and the concealing sheet 42 from the cover plate 12 outside is thereby enabled. Moreover, the guide sheets 40 are only slidably supported by the cover plate 12, enabling, for example, attachment of the guide sheets 40 and the concealing sheets 42 even after the cover plate 12 has been assembled in advance to the headrest 14.

As illustrated in FIG. 4B, in a state in which the guide sheet 40 and the concealing sheet 42 are attached to the cover plate 12, seat width direction movement of the guide sheet 40 and the concealing sheet 42 is restricted by the reinforcement ribs 48, enabling detachment of the guide sheet 40 from the cover plate 12 to be suppressed. Moreover, when force in the seat upward direction acts on the guide sheet 40 or the concealing sheet 42, the stopper portions 48A abut the guide sheet 40 or the concealing sheet 42 and restrict movement in the seat upward direction. These enable movement of the guide sheet 40 and the concealing sheet 42 in directions other than the seat front-rear direction and detachment from the cover plate 12, to be suppressed.

Furthermore, in event that the guide sheet 40 is pulled toward the seat downward, or the guide sheet 40 slides excessively with respect to the cover plate 12, and the one end portion of the guide sheet 40 reach the elongated hole 46A, the anchor tab 40C is anchored (caught) by being abutted with the reinforcement ribs 48 serve as anchoring (catching) portion (refer to FIG. 3). This enables detachment of the guide sheet 40 from the cover plate 12 to be suppressed. The same applies to the another end portion of the guide sheet 40. Note that the reinforcement ribs 48 have been formed as anchoring portion in the present exemplary embodiment, however the invention is not limited thereto, and anchor pins may be provided in standing (protruding) manner to the cover plate 12 so that the anchor tab 40C is anchored for example.

Figure 8:
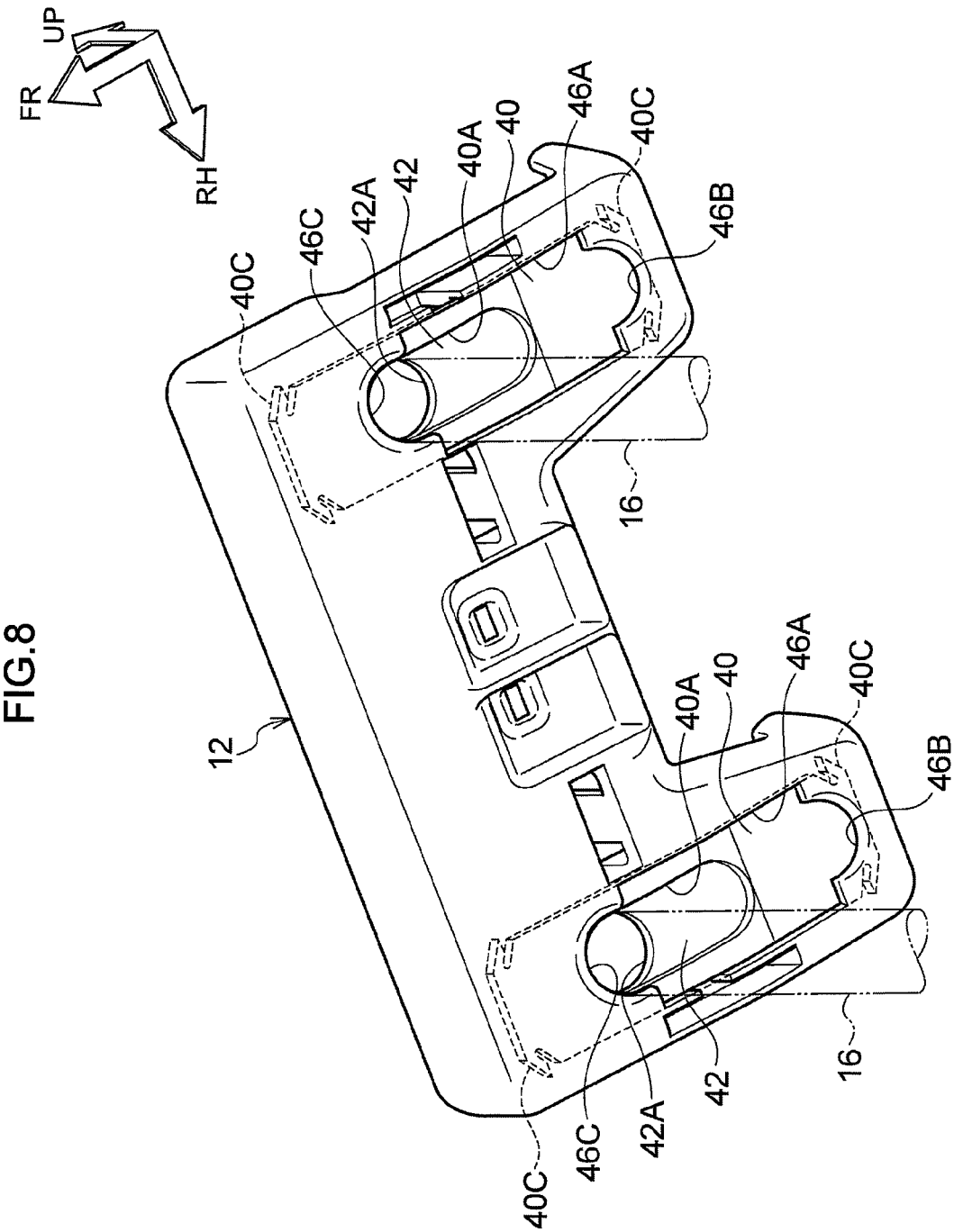
FIG. 8 is a perspective view of a cover plate in a state in which a headrest according to an exemplary embodiment of the present invention is disposed in a release position.

Next, explanation follows with reference to FIG. 6 to FIG. 8 regarding motion of the guide sheet 40 and the concealing sheet 42 when the occupant rotates the headrest 14, in a state in which the headrest device 10 according to the present exemplary embodiment is attached to the seatback 100. Note that illustration of the headrest 14 is omitted in FIG. 6 to FIG. 8, and the headrest stay 16 is shown as a double-dotted dashed line for ease of explanation.

As illustrated in FIG. 6, in the initial position, the headrest stay 16 is entered inside the groove 46B that is formed at the seat rear side end portion of the elongated hole 46A of the cover plate 12. Forming the groove 46B that receives the headrest stay 16 in this way enables the rotating range of the headrest 14 to be widened, while still securing the region supporting both end portions of the guide sheet 40. As a result, the size of the cover plate 12 does not need to be increased. Moreover, even in a case in which the width of the guide sheet 40 is formed as the same as the width of the elongated hole 46A, since the groove 46B is narrower in width than the elongated hole 46A, enabling both length direction end portions of the guide sheet 40 to be supported by regions at the both sides of the groove 46B.

In the state illustrated in FIG. 6, when the occupant rotates the headrest 14, the cover plate 12 rotates together with the headrest 14, and is moved toward the seat rear relative to the headrest stay 16. When this occurs, since the cover plate 12 is formed in a curved shape that corresponds to the rotating trajectory, smooth rotating of the headrest 14 is enabled. Moreover, due to the relative movement of the cover plate 12 and the headrest stay 16, the concealing sheet 42 attached to the headrest stay 16 slides along the upper face of the guide sheet 40.

When the cover plate 12 and the headrest stay 16 move relative to each other, the headrest stay 16 abuts the seat front side end portion of the elongated hole 40A of the guide sheets 40, as illustrated in FIG. 7. The elongated hole 40A of the guide sheet 40 is always covered by the concealing sheet 42, thereby enabling intrusion of foreign objects through the elongated hole 40A of the guide sheet 40 to be suppressed.

When the headrest 14 is rotated further from the state in FIG. 7, the cover plate 12 moves relatively toward the seat rear, and the guide sheet 40 and the concealing sheet 42 slide over the cover plate 12. Then, as illustrated in FIG. 8, the headrest stay 16 enters into the groove 46C formed at the seat front side end portion of the elongated hole 46A (the release position).

In the release position, as previously described, the engaged state of the ratchet plate 32 and the pawl 34 is released, and the headrest 14 rotates to the initial position by the biasing force of the coil spring (refer to FIG. 1). The headrest 14 cannot be rotated any further due to abutting of the headrest stay 16 with the cover plate 12. The guide sheet 40 always covers the elongated hole 46A while sliding over the cover plate 12, enabling intrusion of foreign objects through the elongated hole 46A of the cover plate 12 to be suppressed.

Note that the present invention is not limited the exemplary embodiment, and it goes without saying that various other modifications may be implemented within a range not departing from the spirit of the present invention. For example, in the present exemplary embodiment, two resin sheets, the guide sheet 40 and the concealing sheet 42, are attached to the cover plate 12, however the invention is not limited thus, and three or more kinds of resin sheet may be attached.

What is claimed is:

1. A headrest structure comprising:
a bottom plate that is provided at a lower face of a headrest attached so as to be capable of rotating in a seat front-rear direction with respect to a stay provided at a seatback of a vehicle seat, and that is provided with an elongated hole extending in the seat front-rear direction through which the stay is inserted, the bottom plate being rotated in the seat front-rear direction with respect to the stay by rotation of the headrest in the seat front-rear direction;
a guide sheet that has the same width as a width of the elongated hole, that is longer than a length of the elongated hole, whose both end portions are slidably supported by the bottom plate such that the guide sheet is slidable in the seat front-rear direction on the bottom plate, and that is provided with an elongated guide hole that is smaller than the elongated hole;
a concealing sheet that is provided with an attachment hole to which the stay is attached, and that is overlapped slidably on an upper face of the guide sheet so as to cover the elongated guide hole; and
a wall portion that is formed at the bottom plate, and that restricts movement of the guide sheet and the concealing sheet in a seat width direction,
wherein the wall portion is provided with a stopper portion that projects out from the wall portion in the seat width direction and to an opening face of the elongated hole so as to cover both end portions of the guide sheet in a width direction of the guide sheet and both end portions of the concealing sheet in a width direction of the concealing sheet.

2. The headrest structure of claim 1, wherein anchor tabs, that are anchored at an anchoring portion formed at the bottom plate, are formed at both end portions of the guide sheet in a length direction of the guide sheet.

3. The headrest structure of claim 1, wherein a groove, whose width is narrower than the width of the elongated hole and that receives the stay, is formed at each of both end portions of the elongated hole in a length direction of the elongated hole of the bottom plate.

4. The headrest structure of claim 1, wherein the bottom plate is formed in a curved shape that corresponds to a trajectory of rotation of the headrest.

5. The headrest structure of claim 3, wherein the groove has a semi-circular shape.

6. The headrest structure of claim 1, wherein wall portions are formed at both sides in the seat width direction of the elongated hole so as to sandwich the guide sheet and the concealing sheet.

7. A headrest device comprising:
a headrest at a lower face of which a headrest structure is provided, the headrest structure including:
a bottom plate that is provided at a lower face of a headrest attached so as to be capable of rotating in a seat front-rear direction with respect to a stay provided at a seatback of a vehicle seat, and that is provided with an elongated hole extending in the seat front-rear direction through which the stay is inserted, the bottom plate being rotated in the seat front-rear direction with respect to the stay by rotation of the headrest in the seat front-rear direction;
a guide sheet that has the same width as a width of the elongated hole, that is longer than a length of the elongated hole, whose both end portions are slidably supported by the bottom plate such that the guide sheet is slidable in the seat front-rear direction on the bottom plate, and that is provided with an elongated guide hole that is smaller than the elongated hole;
a concealing sheet that is provided with an attachment hole to which the stay is attached, and that is overlapped slidably on an upper face of the guide sheet so as to cover the elongated guide hole; and
a wall portion that is formed at the bottom plate, and that restricts movement of the guide sheet and the concealing sheet in a seat width direction wherein the wall portion is provided with a stopper portion that projects out from the wall portion in the seat width direction and to an opening face of the elongated hole so as to cover both end portions of the guide sheet in a width direction of the guide sheet and both end portions of the concealing sheet in a width direction of the concealing sheet;
the stay that is attached to the headrest; and
a headrest rotation mechanism that couples the headrest and the stay so as to be capable of rotating in the seat front-rear direction.

8. The headrest device of claim 7, wherein anchor tabs, that are anchored at an anchoring portion formed at the bottom plate, are formed at both end portions of the guide sheet in a length direction of the guide sheet.

9. The headrest device of claim 7, wherein a groove, whose width is narrower than the width of the elongated hole and that receives the stay, is formed at each of both end portions of the elongated hole in a length direction of the elongated hole of the bottom plate.

10. The headrest device of claim 7, wherein the bottom plate is formed in a curved shape that corresponds to a trajectory of rotation of the headrest.

11. The headrest device of claim 9, wherein the groove has a semi-circular shape.

12. The headrest device of claim 7, wherein wall portions are formed at both sides in the seat width direction of the elongated hole so as to sandwich the guide sheet and the concealing sheet.

* * * * *